United States Patent
Paponneau

(10) Patent No.: US 9,453,899 B2
(45) Date of Patent: Sep. 27, 2016

(54) SYSTEM FOR EFFECTING THE ROTATIONAL MOVEMENT OF A SOLAR TRACKER AND SOLAR TRACKING DEVICE COMPRISING SUCH A SYSTEM

(71) Applicant: Exosun, Martillac (FR)

(72) Inventor: François Paponneau, Cestas (FR)

(73) Assignee: EXOSUN, Martillac (FR)

( * ) Notice: Subject to any disclaimer, the term of this patent is extended or adjusted under 35 U.S.C. 154(b) by 140 days.

(21) Appl. No.: 14/408,802

(22) PCT Filed: May 3, 2013

(86) PCT No.: PCT/FR2013/050997
§ 371 (c)(1),
(2) Date: Dec. 17, 2014

(87) PCT Pub. No.: WO2013/190196
PCT Pub. Date: Dec. 27, 2013

(65) Prior Publication Data
US 2016/0124067 A1    May 5, 2016

(30) Foreign Application Priority Data

Jun. 22, 2012 (FR) ...................................... 12 55954

(51) Int. Cl.
*G01S 3/786* (2006.01)
*F24J 2/54* (2006.01)
*F16H 19/08* (2006.01)

(52) U.S. Cl.
CPC .............. *G01S 3/7862* (2013.01); *F16H 19/08* (2013.01); *F24J 2/541* (2013.01); *F24J 2002/5462* (2013.01); *Y02E 10/47* (2013.01)

(58) Field of Classification Search
CPC .... F24J 2002/546; F24J 2/10; F16H 19/001; F16H 19/08; H02S 20/32; G01S 3/786
USPC .......................... 250/203.4, 203.1, 221, 239; 126/571–573, 600–607
See application file for complete search history.

(56) References Cited

U.S. PATENT DOCUMENTS

| | | | |
|---|---|---|---|
| 4,515,148 A | 5/1985 | Boy-Marcotte et al. | |
| 5,169,456 A | 12/1992 | Johnson | |
| 5,203,318 A | * 4/1993 | Chauvet ..................... | F24J 2/07 126/605 |
| 2008/0308091 A1 | 12/2008 | Corio | |

FOREIGN PATENT DOCUMENTS

| | | |
|---|---|---|
| CN | 201992869 U | 9/2011 |
| FR | 2 516 220 | 5/1983 |
| KR | 2009 0118703 | 11/2009 |
| WO | WO 2012/056067 | 5/2012 |

OTHER PUBLICATIONS

PCT/FR2013/050997 International Search Report dated Feb. 27, 2014 (6 pages).

* cited by examiner

*Primary Examiner* — Que T Le
(74) *Attorney, Agent, or Firm* — Brinks Gilson & Lione; G. Peter Nichols

(57) ABSTRACT

A system for effecting the rotational movement of a solar tracker about an axis of rotation includes a bow mounted on the solar tracker and comprising a rack and a worm engaging with the rack to effect the rotational movement, the rack having a plastic tooth set and the bow having a damper configured to dampen the connection with the solar tracker.

10 Claims, 5 Drawing Sheets

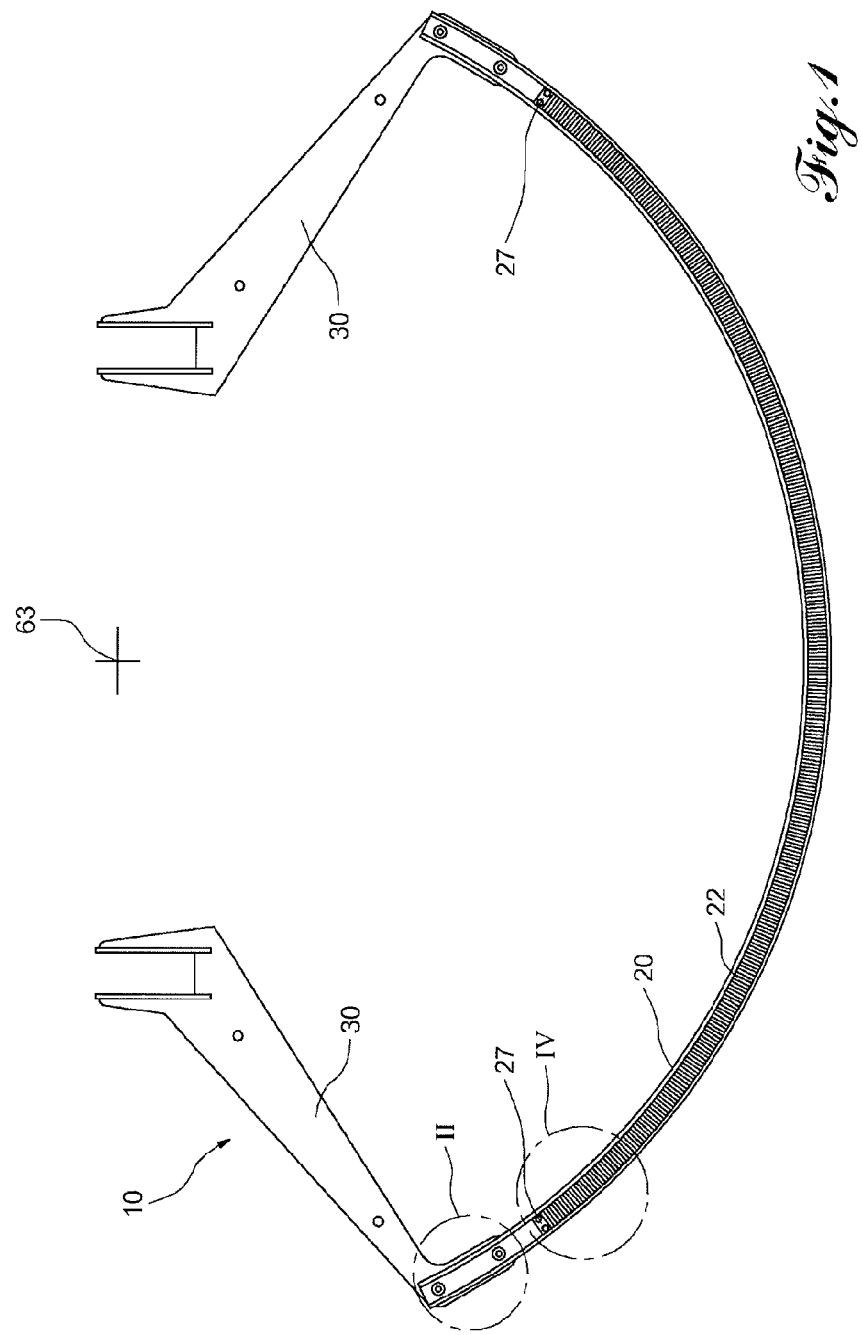

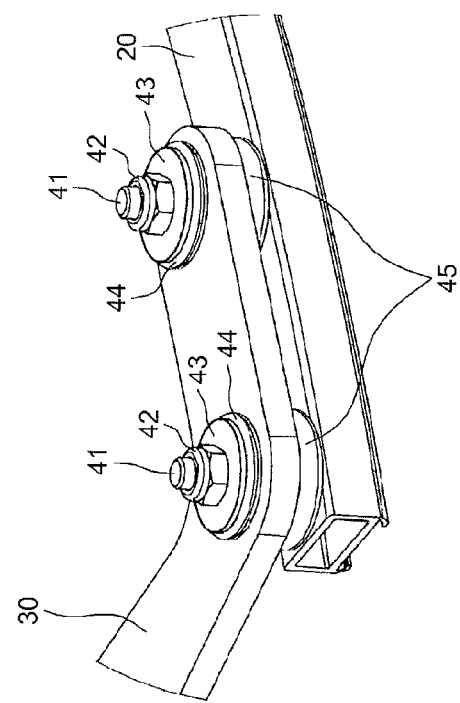
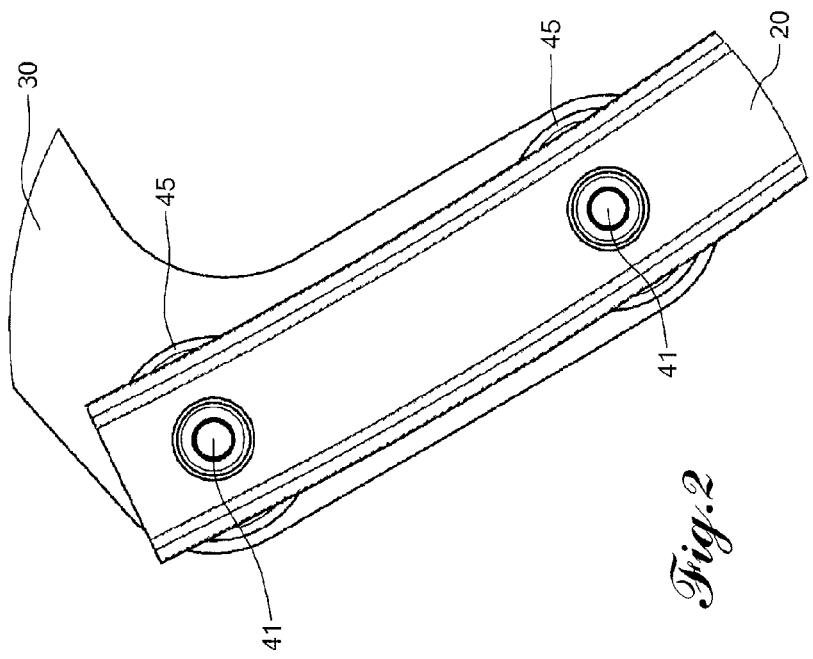

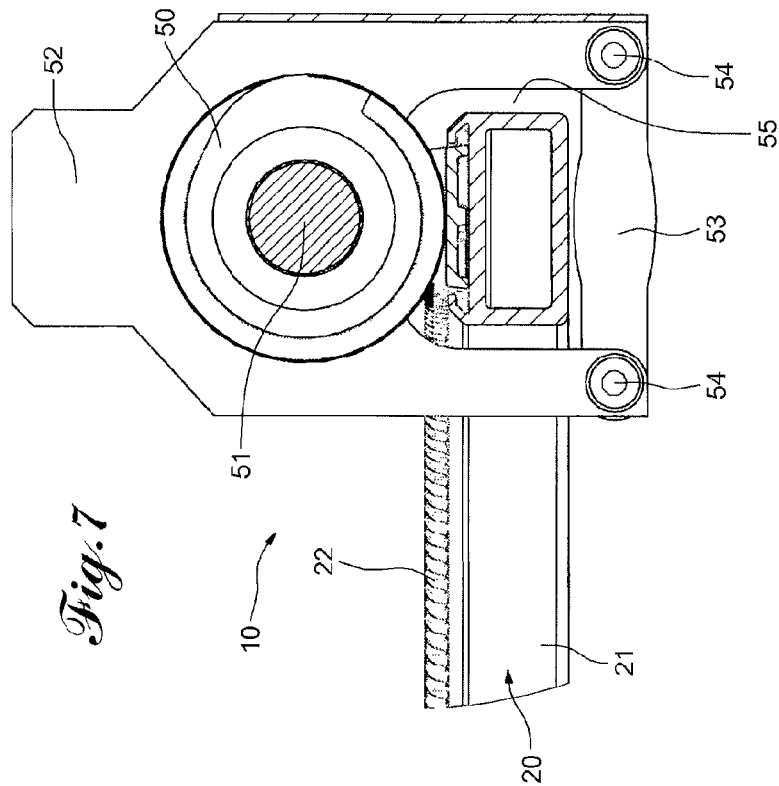
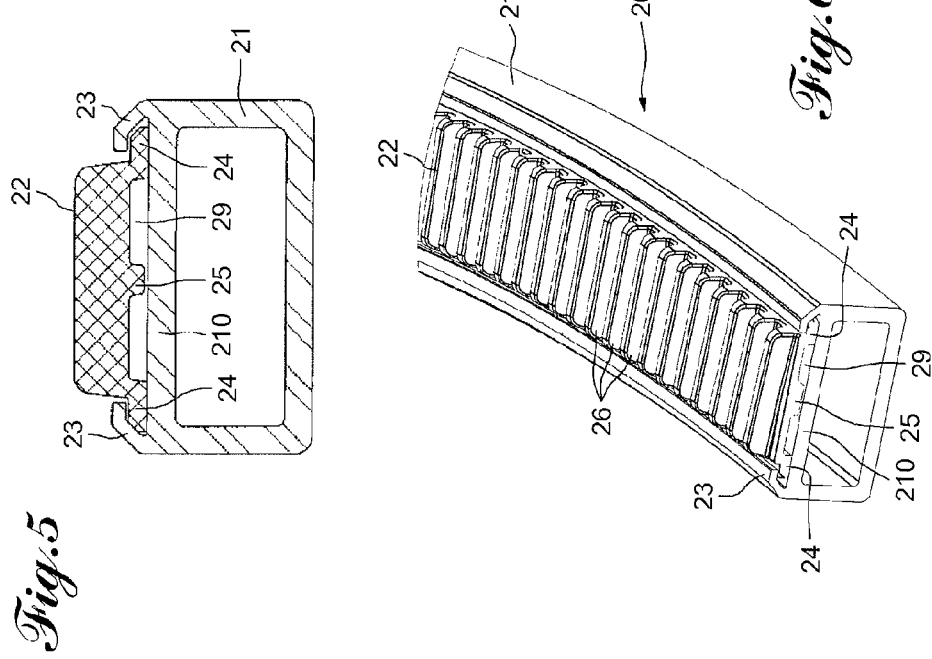

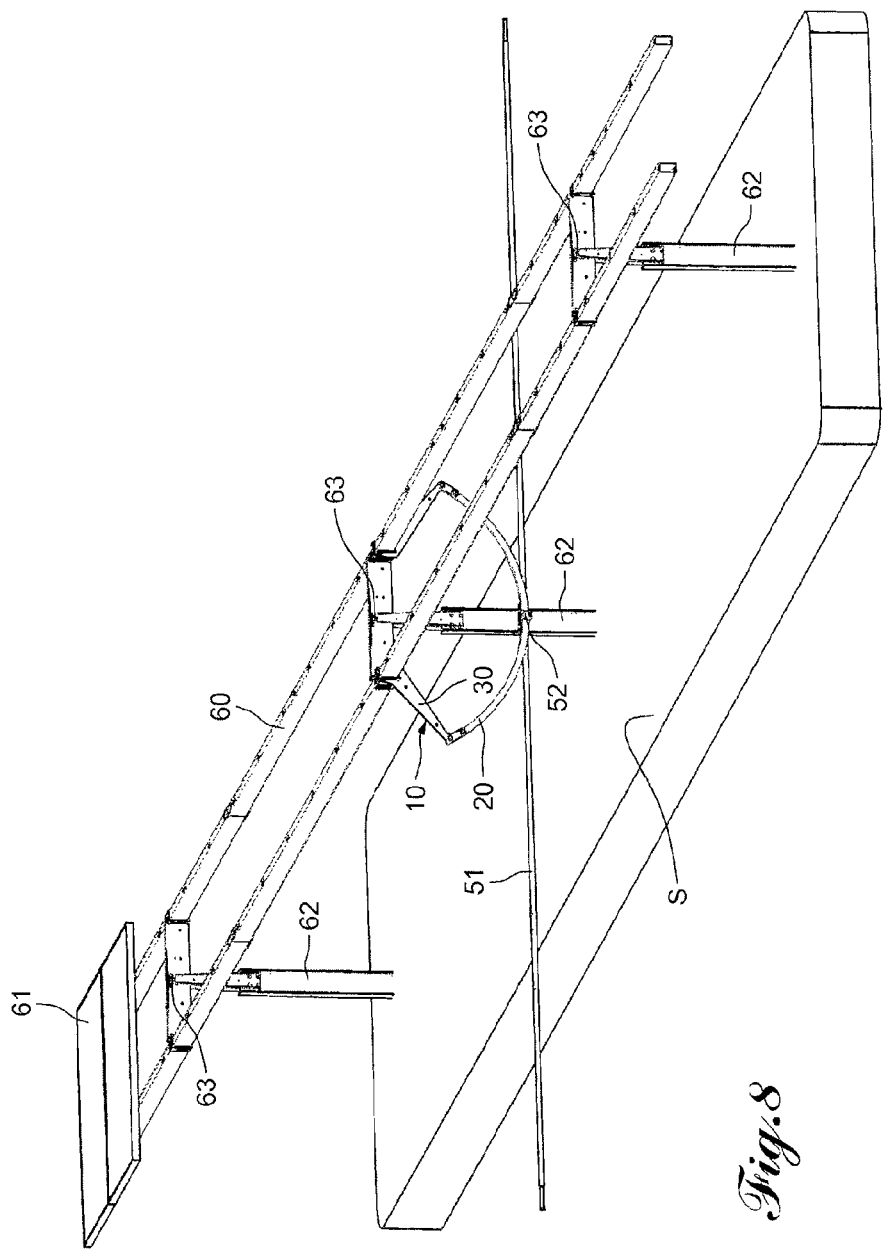

SYSTEM FOR EFFECTING THE ROTATIONAL MOVEMENT OF A SOLAR TRACKER AND SOLAR TRACKING DEVICE COMPRISING SUCH A SYSTEM

This application claims priority to International Application No. PCT/FR2013/050997 filed May 3, 2013 and French Application No. 12 55 954 filed Jun. 22, 2012; the entire contents of each are incorporated herein by reference.

BACKGROUND

The invention relates to a system for moving a solar tracker in rotation about a predetermined axis of rotation, in particular in a solar tracking device comprising solar radiation processing means mounted on a solar tracker which is itself mounted to move in rotation on a frame.

SUMMARY

The solar tracking devices, like that illustrated in FIG. 8, comprise, mounted to move in rotation on a frame 62 about an axis 63, a solar tracker 60 on which is mounted a series of solar radiation processing means 61. In order to produce a rotational movement about the axis 63 of the solar tracker 60, the solar tracking device further comprises a rotational movement system 10 comprising an arch 20 fixed to the solar tracker 60 and driven by a driving means 52 controlled by a transmission shaft 51. Conventionally, the arch 20 is produced, just like the driving means 52, in metallic materials. The contact between the metal of the driving means 52 and the metal of the arch 20 leads to screeching effects due to the vibrations generated at the contact level. Furthermore, these vibrations are transmitted directly to the solar tracker 60 by the arch 20 via fixing tabs 30 making it possible to fix the arch 20 to the solar tracker 60. In order to reduce these screeching effects, and therefore the vibrations, greasing is implemented to reduce the friction at the level of the contact between the arch 20 and the driving means 52. However, implementing such greasing involves heavy maintenance phases in a field comprising hundreds, even thousands, of solar tracking devices thus equipped with an arch 20 and a driving means 52 for said arch 20. In effect, the grease used for the greasing disappears rapidly under the effect of the climatic conditions, in particular being washed away by bad weather.

One aim of the invention is to provide a system for moving a solar tracker in rotation about an axis of rotation which does not necessitate maintenance phases while making it possible to reduce the generation of vibrations which lead to screeching effects.

To this end, there is provided, according to the invention, a system for moving a solar tracker in rotation about an axis of rotation comprising:

an arch mounted on the solar tracker and comprising a rack; and, a worm screw cooperating with the rack in order to produce the rotational movement, the rack comprising teeth made of plastic material and the arch comprising damping means linking with the solar tracker.

The fact that the rack comprises teeth made of plastic material makes it possible, on the one hand, to avoid any metal-metal contact as in the prior art, instead involving a metal-plastic contact which exhibits a very low coefficient of friction, which leads to a reduction in the generation of vibrations causing screeching effects. On the other hand, the use of plastic teeth for the rack makes it possible to not provide greasing, which makes it possible to eliminate the maintenance phases at this level. Finally, the use of linking damping means between the arch and the solar tracker makes it possible to eliminate the transmission of the residual vibrations between the arch and said tracker.

Advantageously, but optionally, the system for moving a solar tracker in rotation according to the invention comprises at least one of the following technical features:

the arch comprises a curved profile member on which is positioned a series of parts made of plastic material forming the rack;

the curved profile member comprises a gutter arranged in such a way as to receive the series of parts made of plastic material;

the rack is mounted to slide in the gutter, the arch further comprising abutment means for keeping the rack in position in the gutter;

the parts made of plastic material comprise tabs having a beveled form at a free end arranged in such a way as to cooperate by bearing with a wall of the gutter;

the rack is mounted in position by clipping into the gutter;

the rack is formed on a flank of the arch contained in a plane at right angles to the axis of rotation;

the linking damping means comprise damping blocks interposed between the arch and the solar tracker;

the damping blocks are produced in an elastomer of EPDM (Ethylene-Propylene-Diene Monomer) type;

the plastic material of the teeth includes fibres to reinforce it.

There is also provided, according to the invention, a solar tracking device comprising solar radiation processing means mounted on a solar tracker which is itself mounted to move in rotation on a frame and further comprising a rotational movement system with at least one of the preceding features.

BRIEF DESCRIPTION OF THE DRAWINGS

Other features and advantages of the invention will become apparent from the following description of an embodiment of the invention. In the attached drawings:

FIG. 1 is a front view of an arch of a system for moving a solar tracker in rotation according to the invention;

FIG. 2 is a partial view of the detail II of FIG. 1;

FIG. 3 is a partial three-dimensional view of the detail II of FIG. 2;

FIG. 5 is a cross-sectional view on V-V of the detail of FIG. 4;

FIG. 6 is a three-dimensional partial view illustrating the mounting of the teeth on the arch in the system for moving a solar tracker in rotation of FIG. 1;

FIG. 7 is a cross-sectional view of the system for moving a solar tracker in rotation according to the invention; and FIG. 8 is a three-dimensional view of a solar tracking device comprising a system for moving a solar tracker in rotation.

DETAILED DESCRIPTION

Figure 4:
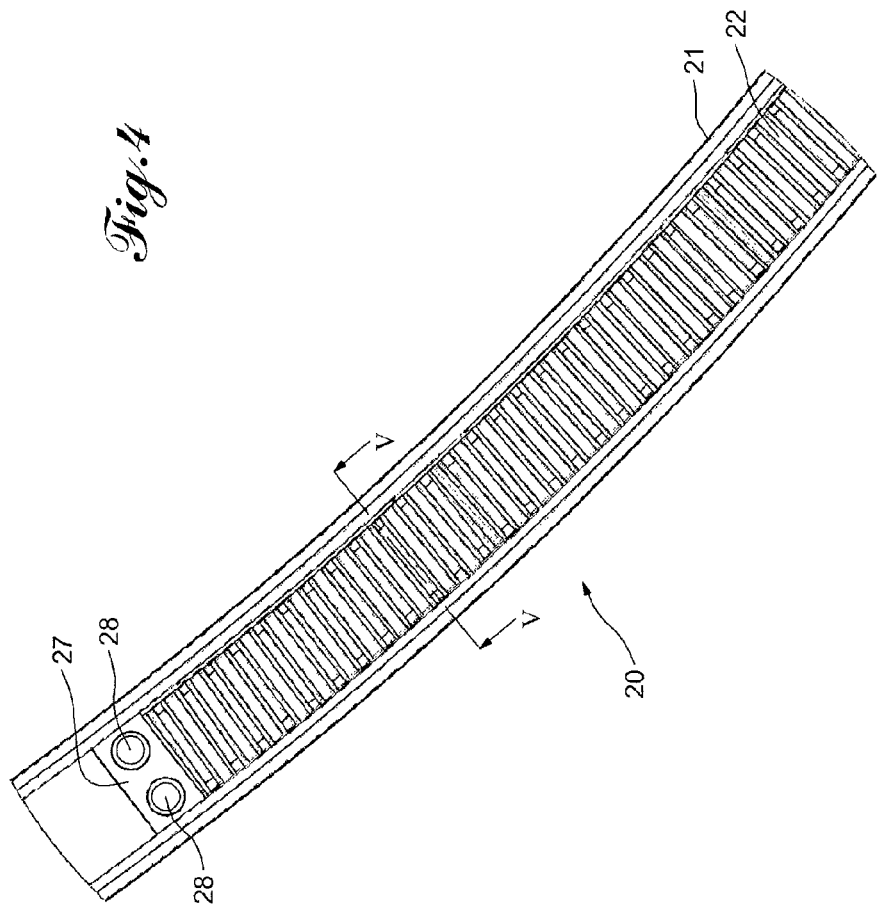
FIG. 4 is a partial view of the detail IV of FIG. 1.

Referring to FIG. 1, the system for moving a solar tracker in rotation 10 according to the invention comprises an arch 20 forming a circular arc whose centre is on the axis of rotation 63. The arch 20 is fixed at each of its ends to a link part 30 making it possible to link the arch 20 to the framework of the solar tracker 60. The link between each of the ends of the arch 20 with the link parts 30 is illustrated in detail in FIGS. 2 and 3. Each of the ends of the arch 20 has orifices passing through the arch 20. Here, there are two of these orifices. Also, they are at right angles to a plane of the arch and come, when the arch 20 is mounted on the link parts 30, to face equivalent orifices situated at an end of each of the link parts 30. When the arch 20 is mounted on the link parts 30, a screw 41 is introduced into each of the orifices passing through the arch 20, then a first damping means 45 is positioned on each of the screws 41, then the link part 30 is put in place on the two screws 41 so as to sandwich the first damping means 45 between the link part 30 and the arch 20. Then, each of the screws 41 has a second damping means 44 threaded onto it, followed by a washer 43, the duly produced stack assembly then being tightened using a nut 42 screwed onto a threading situated at the end of each of the screws 41. The first damping means 45 and the second damping means 44 are of "Silentbloc" type. In particular, the first damping means 45 and the second damping means 44 take the form of washers or blocks made of elastomer of EPDM (Ethylene-Propylene-Diene Monomer) type. The advantage of using an elastomer of EPDM type is that it makes it possible to obtain first damping means 45 and second damping means 44 which withstand the outside conditions, that is to say, in particular, water and ultraviolet rays due to the solar radiation. Once mounted, the link part 30 is, from the vibrational point of view, insulated from the arch 20 by the first 45 and second 44 damping means. Other elastomers can be used for this purpose.

In a variant embodiment, the first 45 and second 44 damping means form a single part so that, when mounting, the part is introduced through the orifice of the link parts 30. Other damping means can be used.

Referring to FIGS. 4 to 6, there now follows a more detailed description of the arch 20 of the rotational movement system 10 according to the invention. The arch 20 comprises a profile member 21. The profile member 21 is made of a metallic material, preferably of aluminium. In order to keep it as light as possible, the profile member 21 is hollow and has a rectangular section with the small sides respectively forming a radially outer periphery and a radially inner periphery of the arch 20. The small sides are linked to one another by large sides forming flanks of the arch 20. The profile member 21 is curved. One 210 of the flanks of the arch 20 comprises a gutter 29 delimited at the radially outer periphery and the radially inner periphery of the arch 20 by walls 23 extending facing one another and protruding from the flank 210. Furthermore, the walls 23 are inclined towards one another in order to form means for retaining a rack 22 in the gutter 29. The teeth 22 are then added to the profile member 21 of the arch 20 by the insertion thereof into the gutter 29. The rack 22 is produced in a plastic material possibly fibre-reinforced in order to form a composite plastic material. The rack 22 can be of a single piece. However, in a preferred embodiment, the rack 22 is made up of a series of plastic parts which are placed end to end in the gutter 29.

The rack 22 comprises, on one face, teeth 26 substantially at right angles to a longitudinal axis of the rack 22. Furthermore, the rack 22 comprises, on a face intended to be facing the flank 210 of the profile member 21, a central rib 25 and lateral tabs 24 situated on either side of the central rib 25. The tabs 24 extend laterally protruding from the rack 22. The tabs 24 are continuous and extend along the rack 22. In a variant, the tabs 24 are discontinuous. Also, the tabs 24 have a beveled form arranged in such a way that, when one of the tabs 24 bears on the corresponding wall 23 of the gutter 29, the beveled form of the tab 24 adopts the form of the inclined wall 23. Thus, when mounting the rack 22 in the gutter 29 of the profile member 21 of the arch 20, the tabs cooperate with the lateral walls 23 of the gutter 29 so as to keep the rack 22 in the gutter 29. In a first embodiment, the rack 22 is mounted to slide in the gutter 29. Such a mounting makes it possible to correctly position the rack 22 or the series of plastic parts forming the rack 22 on the arch 20 of the system for moving a solar tracker in rotation 10 according to the invention. Once the rack is positioned, abutment-forming means 27 are positioned in the gutter 29 so as to block the rack 22 in position on the profile member 21 of the arch 20. The abutments 27 are immobilized in position using fixing means 28, here rivets. In a variant, the abutment-forming means 27 are arranged in such a way as to be retained by the lateral walls 23 of the gutter 29. In a variant embodiment, the rack 22 or the series of plastic parts forming the rack 22 have lateral tabs 24 arranged in such a way as to allow the rack 22 to be clipped into the gutter 29. Other means for blocking the rack 22 in the gutter 29 are possible, such as riveting or screwing. When the abutment-forming means 27 are put in place, the rack 22 is compressed on itself between said abutment-forming means in such a way that one of the tabs 24 situated at the radially outer periphery of the arch 20 comes to bear on the corresponding wall 23 of the gutter 29, the beveled form of the tab 24 ensuring, by cooperation with the corresponding wall 23, that the rack 22 is kept immobile in the gutter 29.

Referring to FIG. 7, the rotational movement system 10 according to the invention comprises means for driving the rack 22 of the arch 20. These driving means comprise a cage 52 in which is formed a housing to receive a worm screw 50. The worm screw 50 is received to move rotationally about its axis in said housing of the cage 52 and is driven by a shaft 51 in this rotational movement. Once mounted to rotate in the cage 52, the worm screw 50, having an external threading, protrudes into an adjacent passage 55. The passage 55 is U-shaped and open on a bottom part of the cage 52. The passage 55 is intended to receive the arch 20, in such a way that the rack 22 cooperates with the external threading of the worm screw 50. In order to ensure this cooperation, the cage 52 has a cover 53 removably fixed to each of the ends 54 of the branches of the U delimiting the passage 55. The cover 53, once put in place on the cage 52, makes it possible to avoid any disengagement of the teeth 26 of the rack 22 and of the threading of the worm screw 50 throughout the relative movement between the cage 52 and the arch 20. In effect, before the disengagement occurs, the cover 53 comes to bear on the flank opposite the flank 210 of the profile member 21, then ensuring the cooperation between the rack 22 of the arch 20 and the worm screw 50. The worm screw 50 is made of stainless steel for example.

The fact of using a rack made of plastic material coming into contact with a metal worm screw, in particular made of stainless steel, makes it possible to reduce the friction and therefore the vibrations which generate the screeching effects previously described while avoiding providing for greasing of the rack 22 and of the worm screw 50. Thus, any maintenance phases (greasing) are eliminated. However, the contact between the worm screw and the rack 22 does generate residual vibrations which are absorbed by the first 45 and second 44 damping means situated between the arch 20 and the parts 30 for mounting the arch on the solar tracker 60.

Another advantage of mounting a rack made of plastic material in a gutter 29 formed on a flank 210 of the arch 20 is that it makes it possible to take up any mounting play, which can be significant, of the solar tracking device, like that illustrated in FIG. 8, comprising a system for moving a solar tracker in rotation 10 according to the invention. This allows for extremely simplified and rapid mounting and placement of the solar tracking device on its site S while ensuring optimum accuracy of the solar tracking during the operation of the solar tracking device comprising the system for moving a solar tracker in rotation 10 according to the invention.

Obviously, it is possible to add many modifications to the invention without in any way departing from the framework thereof. For example, the rack 22 can be positioned on an edge of the arch 20, in particular on a radially outer peripheral edge.

The invention claimed is:

1. An apparatus to move a solar tracker in rotation about an axis of rotation comprising:
   an arch mounted on the solar tracker and comprising a rack; and,
   a worm screw cooperating with the rack in order to produce rotational movement, wherein rack comprises teeth made of plastic material and the arch comprises a damper linked with the solar tracker.

2. The apparatus according to claim 1, wherein the arch comprises a curved profile member on which is positioned a series of parts made of plastic material forming the rack.

3. The apparatus according to claim 2, wherein the curved profile member comprises a gutter configured to receive the series of parts made of plastic material.

4. The apparatus according to claim 3, wherein the series of parts made of plastic material is mounted to slide in the gutter and the arch further comprises an abutment configured to keep the series of parts made of plastic material in position in the gutter.

5. The apparatus according to claim 3, wherein the parts made of plastic material comprise tabs having a beveled form at a free end arranged in such a way as to cooperate by bearing with a wall of the gutter.

6. The apparatus according to claim 3, wherein the series of parts made of plastic material is mounted in position by clipping into the gutter.

7. The apparatus according to claim 1, wherein the rack is formed on a flank of the arch contained in a plane at right angles to the axis of rotation.

8. The apparatus according to claim 1, wherein the damper includes damping blocks interposed between the arch and the solar tracker.

9. The apparatus according to claim 1, wherein the plastic material of the teeth includes fibers to reinforce the teeth.

10. A solar tracking device comprising solar radiation processor mounted on a solar tracker, the solar tracker being mounted to move in rotation on a frame, wherein the device further comprises the apparatus for moving the solar tracker in rotation according to claim 1.

* * * * *